(12) United States Patent
Losh

(10) Patent No.: US 6,173,181 B1
(45) Date of Patent: Jan. 9, 2001

(54) METHOD AND SYSTEM FOR CONTROLLING NEIGHBOR SCANNING IN A SUBSCRIBER UNIT IN A CELLULAR COMMUNICATION SYSTEM

(75) Inventor: Jason Haines Losh, Arlington, TX (US)

(73) Assignee: Motorola, Inc., Schaumburg, IL (US)

( * ) Notice: Under 35 U.S.C. 154(b), the term of this patent shall be extended for 0 days.

(21) Appl. No.: 08/965,828

(22) Filed: Nov. 7, 1997

(51) Int. Cl.⁷ .................................................. H04Q 7/20
(52) U.S. Cl. ...................... 455/434; 455/437; 370/329
(58) Field of Search .................. 455/434, 436, 455/437, 515, 525, 509, 439, 422, 517, 453, 450; 370/329

(56) References Cited

U.S. PATENT DOCUMENTS

| | | | |
|---|---|---|---|
| 5,241,685 | * | 8/1993 | Bodin et al. ........................ 455/33.2 |
| 5,428,816 | * | 6/1995 | Barnett et al. ...................... 455/33.2 |
| 5,432,843 | * | 7/1995 | Bonta ..................................... 379/60 |
| 5,640,676 | * | 6/1997 | Garncarz et al. ................... 455/33.2 |
| 5,649,291 | * | 7/1997 | Tayloe ................................. 370/332 |
| 5,666,650 | * | 9/1997 | Turcotte et al. ..................... 370/329 |
| 5,701,585 | * | 12/1997 | Kallin et al. ......................... 455/437 |
| 5,754,956 | * | 5/1998 | Abreu et al. ......................... 455/434 |
| 5,784,693 | * | 7/1998 | Barber et al. ........................ 455/434 |
| 5,845,981 | * | 12/1998 | Wallstedt et al. ................... 455/439 |
| 5,848,063 | * | 12/1998 | Weaver, Jr. et al. ................ 370/331 |
| 5,907,807 | * | 5/1999 | Chavez, Jr. et al. ................ 455/436 |

* cited by examiner

Primary Examiner—Dwayne D. Bost
Assistant Examiner—Joy Redmon
(74) Attorney, Agent, or Firm—L. Bruce Terry

(57) ABSTRACT

In a cellular communication system, a plurality of neighbor scan lists are generated and associated with a selected cell in the cellular communication system, wherein each neighbor scan list includes selected neighbor identifiers. Thereafter, a present operating mode, of a plurality of operating modes, of a subscriber unit communicating with the selected cell is determined. In response to the present operating mode of the subscriber unit, the subscriber unit is configured to scan a neighbor scan list selected from the plurality of neighbor scan lists for the selected cell. The operating modes of the subscriber unit may include an idle mode and an active mode.

18 Claims, 4 Drawing Sheets

| CANDIDATE SCAN LIST CELL C0 F2 | MODE INSTRUCTIONS |
|---|---|
| C1  F2 | ALL MODES |
| C2  F2 | ALL MODES |
| C3  F2 | ALL MODES |
| C4  F2 | ALL MODES |
| C5  F1 | IDLE MODE ONLY |
| C6  F1 | IDLE MODE ONLY |
| C5  F2  PB | ACTIVE MODE ONLY |
| C6  F2  PB | ACTIVE MODE ONLY |
| C7  F1 | IDLE MODE ONLY |
| C8  F1 | IDLE MODE ONLY |
| C8  F2  PB | ACTIVE MODE ONLY |
| C10  F1 | IDLE MODE ONLY |

| NEIGHBOR SCAN LIST IDLE MODE |
|---|
| C1  F2 |
| C2  F2 |
| C3  F2 |
| C4  F2 |
| C5  F1 |
| C6  F1 |
| C7  F1 |
| C8  F1 |
| C10  F1 |

| NEIGHBOR SCAN LIST ACTIVE MODE |
|---|
| C1  F2 |
| C2  F2 |
| C3  F2 |
| C4  F2 |
| C5  F2  PB |
| C6  F2  PB |
| C8  F2  PB |

METHOD AND SYSTEM FOR CONTROLLING NEIGHBOR SCANNING IN A SUBSCRIBER UNIT IN A CELLULAR COMMUNICATION SYSTEM

FIELD OF THE INVENTION

This invention relates generally to cellular communication systems, and more specifically to a method and system for controlling neighbor scanning in a subscriber unit in a cellular communications system.

BACKGROUND OF THE INVENTION

In a cellular communications system, subscriber units communicate voice and/or data with one or more base stations. As a subscriber unit moves through a coverage area, the subscriber unit communication channel is switched or handed off from one base station to another base station in order to improve the communication link.

In more sophisticated cellular communication systems, the subscriber unit takes on a greater share of the task of deciding which base station to communicate with. For example, when the subscriber unit is in an idle mode, which is a mode in which the subscriber unit has not been assigned a traffic channel, the subscriber unit may monitor paging messages or other overhead messages transmitted by nearby base stations in order to receive notification of an incoming call. As the subscriber unit moves through the service area, it decides which base station is the best base station to monitor for receiving these messages.

When the subscriber unit is in an active mode, wherein the subscriber unit has been assigned a traffic channel, the subscriber unit scans signals from neighboring base stations in order to report the characteristics of those signals so that a mobility manager may determine whether or not a better communication link can be established with an alternate base station.

The list of base station signals scanned by the subscriber unit is contained in a neighbor scan list. This neighbor scan list contains neighbor identifiers that instruct the subscriber unit how to receive and measure signals from neighboring base stations. For example, in a CDMA (Code Division Multiple Access) system, a neighbor identifier may include a frequency, a pilot offset, and other information describing the configuration of that base station. Such configuration information may describe the number and location of the paging channels for the base station.

The subscriber unit typically receives a neighbor scan list as one of the overhead messages that is transmitted on the paging channel to all subscribers currently monitoring that paging channel. After receiving a neighbor scan list from the paging channel, the subscriber unit typically enters the idle mode, wherein the subscriber unit is waiting to receive or initiate a call.

One problem with the neighbor scan lists that are broadcast on the paging channel is that these lists are often too long for idle mode scanning. They are too long because they contain neighbor identifiers that are needed only after the subscriber enters the active mode. The problem with scanning too many neighbors in the idle mode is that it reduces standby battery life by causing the subscriber unit to stay awake longer to scan signals associated with all the neighbor identifiers.

Additionally, the subscriber unit may be asked to scan signals from base stations that do not support a traffic channel. For example, some cells may have a base station that transmits a pilot channel, and does not support a traffic channel. These cells are often referred to as a "pilot beacon cells." These pilot beacon cells are used to determine that a subscriber unit is reaching the outer limits of the cellular coverage area. In some instances, the subscriber unit may attempt an idle-mode handoff to one of these "pilot beacon cells" with no traffic channel. This may result in additional delays in acquiring a new cell that supports traffic channels. These delays occur because the handoff is not direct to a cell that supports a traffic channel—rather the handoff is indirect to a pilot beacon cell that expressly, or by default, directs the subscriber unit to a cell on another frequency. During this "indirect idle-mode handoff" the subscriber unit may not be able to receive an incoming call or originate an outgoing call.

After a call has been received or initiated, and after the subscriber unit has been assigned a traffic channel, the subscriber unit may receive messages that update the neighbor scan list while it is in the active mode. But there are problems with receiving neighbor scan list updates when the subscriber unit is in the active mode.

First, sending neighbor scan list update messages must be directed to a particular user, and second, the list must be transmitted in the CDMA traffic channel. When in the idle mode, neighbor scan lists are broadcast to all listening subscriber units, which requires less message processing and does not displace any data in the traffic channel. In known cellular systems, a lengthy message may be required to modify the neighbor scan list or transmit a totally new neighbor scan list. Such lengthy messages in the traffic channel may degrade voice or user data transmission.

With reference now to FIG. 1, there is depicted a portion of a service area 20 of a cellular communication system. Shown in service area 20 are fifteen cells numbered C0–C14. Cells C0–C4 each contain two carriers operating on frequencies $F_1$ and $F_2$. For example, as shown in cell C3, the two carrier frequencies are shown at reference numerals 22 and 24. As indicated by solid lines, both frequency $F_1$, 22 and $F_2$, 24 support a traffic channel, which transmits user data.

Cells C5, C6 and C8 each contain a traffic channel on frequency $F_1$. However, on frequency $F_2$, cells C5, C6 and C8 have a pilot beacon, and perhaps a paging channel and a sync channel, but no traffic channel. The pilot beacon on frequency $F_2$ is shown at reference numeral 26 with a dashed line.

Cells C7, C9–C11 only broadcast on frequency $F_1$; these cells do not have any transmission on frequency $F_2$. Cells C12–C14 have only a pilot beacon on $F_1$, as indicated by dashed lines.

The cell configurations shown in service area 20 analogously resemble a wedding cake, which may occur at the boundary between a high traffic area and a lower traffic area, wherein the high traffic area is supported by two carrier frequencies. On the boundary between the high traffic area and the lower traffic area, pilot beacons are used to help the mobility manager decide when a call should be handed off from frequency $F_2$ to frequency $F_1$.

When subscriber unit 28 powers up in cell C0 on $F_2$, the $F_2$ paging channel transmits neighbor scan list 30 to all subscriber units monitoring the paging channel. Note that when the subscriber unit is in the idle mode, it can make measurements on more than one frequency because it can retune its receiver without having to worry about continuously receiving traffic. Thus, neighbor scan list 30 includes neighbor identifiers for cells C1–C7 on frequency 1, and also neighbor identifiers for cells C1–C6 for frequency 2.

The neighbor identifiers that comprise neighbor scan list 30 are typically selected by the cellular communications system designer because they are signals associated with base stations with which the subscriber unit is most likely to establish its next communication link. For example, as subscriber unit 28 moves out of cell C0 it is likely that one of the signals identified in neighbor scan list 30 will become a more desirable signal with which the subscriber unit can maintain communication with the cellular communication system. Neighbor scan list 30 merely predicts and informs the subscriber unit where its next communication link with the communication system may be established rather than relying upon the subscriber unit to find the next base station link by itself.

In some situations, neighbor scan list 30 includes neighbor identifiers, such as C5 $F_2$ and C6 $F_2$, which are pilot beacon cells. Including pilot beacon cells in the neighbor scan list causes the problem associated with the indirect idle-mode handoff, as discussed above.

The reason pilot beacons are included in neighbor scan list 30 is because the subscriber unit may use them after entering the active mode to perform a hard handoff from, for example, frequency $F_2$ to frequency $F_1$ in cells C5, C6, or C8. A problem arises when subscriber unit 28 initiates an outgoing call just as subscriber unit 28 travels out of cell C0 while communicating on frequency $F_2$. To facilitate a subscriber handoff to frequency $F_1$, subscriber unit 28 reports handoff information obtained from receiving pilot beacons and paging channels on $F_2$ from cells C5, C6, and C8. If this handoff information is not immediately available upon entering the active mode as the subscriber leaves C0, the call may be dropped. Therefore, in the prior art, the neighbor can list used in the idle mode included extra neighbor identifiers that were needed only after the subscriber entered the active mode. This made the neighbor scan list used in the idle mode longer than it needed to be for idle mode operation.

Thus, it should be apparent that there are disadvantages to having to many or to few neighbor identifiers in the neighbor scan list as the subscriber unit changes between an idle mode and an active mode. Therefore, a need exists for an improved method and system for controlling neighbor scanning in a subscriber unit in a cellular communication system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
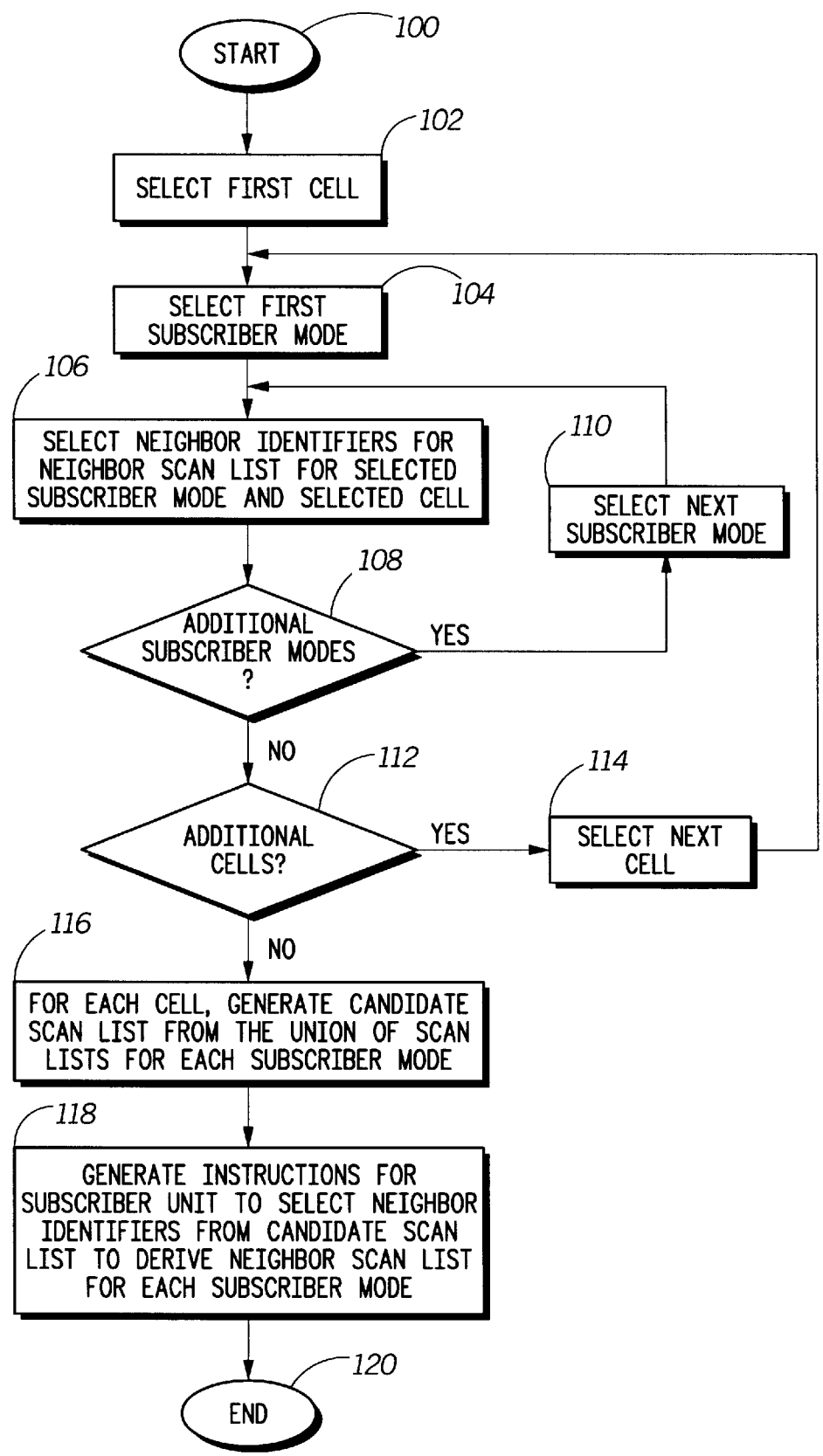
FIG. 2 is a high-level logical flow chart which illustrates the method of associating neighbor scan list with subscriber modes in accordance with the method and system of the present invention.

With reference to the figures, and in particular with reference to FIG. 2, there is depicted a high-level flow chart which illustrates the process of selecting neighbor identifiers for neighbor scan list in with the method and system of the present invention. As illustrated, the process begins at block 100, and thereafter passes to block 102 wherein the process selects a first cell in the cellular communication system. Next, the process selects a first subscriber mode from a plurality of subscriber operating modes, as illustrated at block 104. Such subscriber modes may include an idle mode, wherein a traffic channel has not been assigned and the subscriber unit is waiting to initiate or receive a call over a traffic channel, and an active mode, wherein the subscriber unit has been assigned a traffic channel for transferring user data. Additional operating modes may be defined in the subscriber unit as needed to manage neighbor scanning in various modes of operation of the cellular communication system. These operating modes may include a roaming mode, a high speed data mode, a data-only mode, a selected protocol mode, or any other operating mode, or subscriber capability (e.g., subscriber protocol revision), that may cause the cellular system designer to customize the selection of neighbor identifiers in the neighbor scan list.

Next, the process selects neighbor identifiers for a neighbor scan list for the selected subscriber mode and the selected cell, as depicted at block 106. Neighbor identifiers include information necessary for a subscriber unit to receive a signal or other data from an identified cell.

Figures 4, 5, 6, 7:
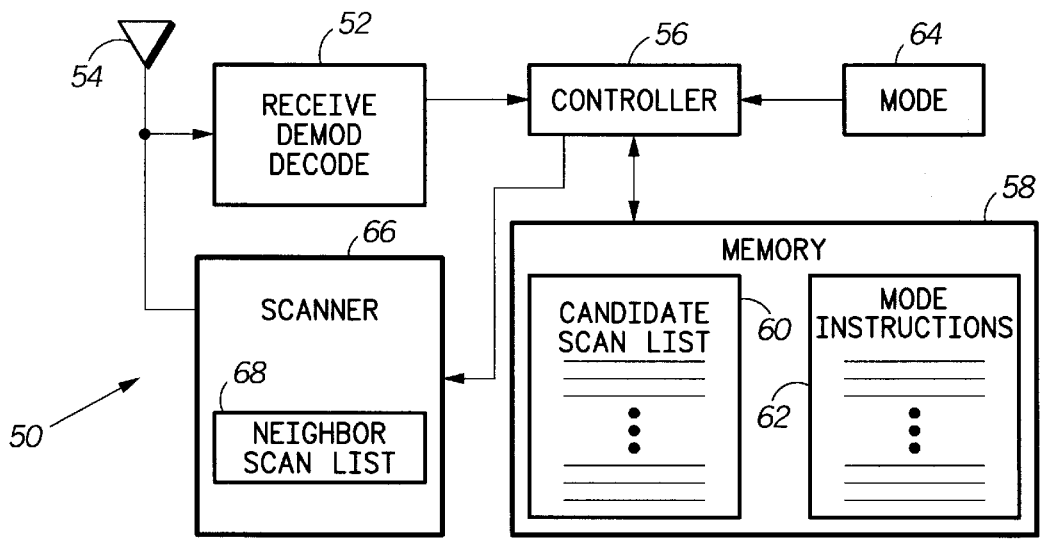
FIG. 4 is a high-level block diagram of a portion of a subscriber unit which may be used to implement the method and system of the present invention.
FIG. 5 is a candidate scan list and associated mode instructions in accordance with the method and system of the present invention.
FIG. 6 is a neighbor scan list for a subscriber in the idle mode which has been derived in accordance with the method and system of the present invention.
FIG. 7 is a neighbor scan list for a subscriber in the active mode which has been derived in accordance with the method and system of the present invention.

According to an important aspect of the present invention, the system designer selects neighbor identifiers based upon what operating mode the subscriber is in and what cell the subscriber unit is communicating with. For example, if cell C0 is the selected cell (the cell the subscriber unit is communicating with), and the idle mode is the selected subscriber mode, the neighbor identifiers in the C0 idle mode neighbor scan list may include C1–C4 on frequency $F_2$ and C5–C8, and C10 on frequency $F_1$. This neighbor scan list is shown in FIG. 6. Note that the neighbor scan list for the idle mode may include more than one frequency because the subscriber unit can more easily retune to an alternate frequency in the idle mode while it is not processing a traffic channel data stream. Also note that pilot beacons, such as C5, C6, and C8 on $F_2$, are not included in the idle mode neighbor scan list because the subscriber unit may not be able to receive paging messages or initiate an outgoing call from these pilot beacon cells.

In an active mode neighbor scan list, the cellular system designer may wish to include or delete neighbor identifiers which may or may not have been in the idle mode scan list. As shown in FIG. 7, the process may select neighbor identifiers for an active mode neighbor scan list that include signals on the same frequency, and may also include pilot beacon (PB) signals. Selecting neighbor identifiers for signals on the same frequency is desired because the subscriber unit may have difficulty scanning signals on a frequency other than the traffic channel frequency. Pilot beacons may be desired in the active mode scan list because they give direction to the cellular system regarding hard handoff to another frequency as the subscriber unit reaches the edge of coverage for the current frequency.

Those persons skilled in the art should recognize that neighbor identifiers may be included or excluded from neighbor scan lists based upon a number of factors and peculiarities of system operation. In fact, cells and their associated pilot beacons may be classified into different classes according to their purpose. For example, a first classification may be assigned to cells having more than one carrier frequency supporting a traffic channel. A second classification may identify a cell with one carrier frequency that supports a traffic channel and another carrier frequency that supports only a pilot beacon and a paging channel. A third classification of cells may be assigned to cells with only a pilot beacon. The purpose of the second class of cells may be to indicate that a subscriber will soon need to perform a hard handoff between carrier frequencies as the subscriber unit travels toward the second class of cell. The purpose of the third class of cell may indicate that the subscriber unit is traveling toward the edge of the coverage area for the current multiple access scheme, and the subscriber may be dropped, or may need to scan to explore the possibility of a hard handoff to another multiple access system. For example, the subscriber may be approaching the edge of CDMA coverage and the pilot beacon may inform the subscriber unit to scan for, say, a signal from an AMPS (advanced mobile phone service) system in order to handoff to continue the call.

Figure 1:
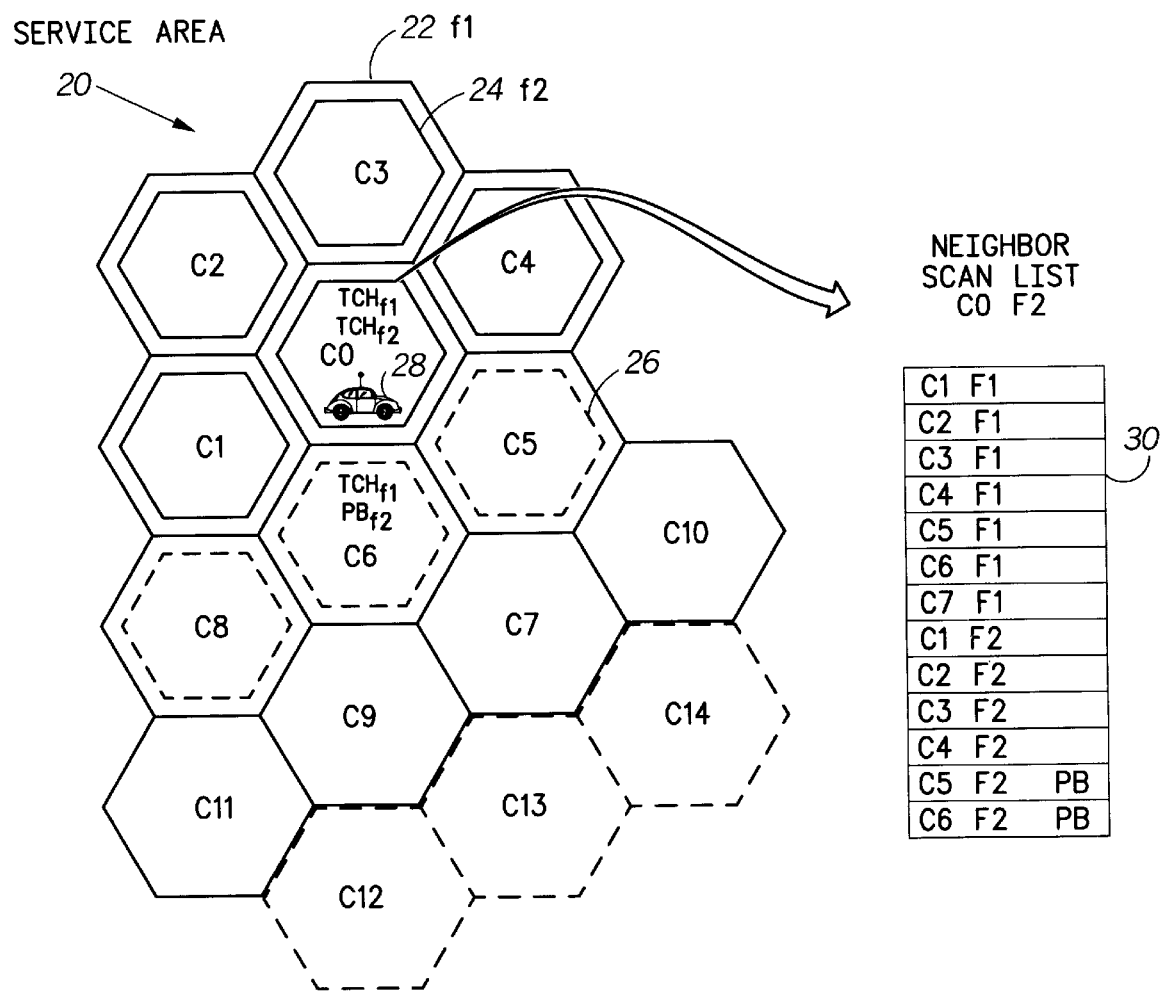
FIG. 1 depicts a portion of a service area of a cellular communications system, and a neighbor scan list, according to the prior art.

As illustrated in FIG. 1, class one cells may include C5, C6, and C8. Class three cells may include cells C12–C14.

Next, the process determines whether or not there are additional subscriber modes for which a neighbor scan list should be selected, as illustrated at block 108. If there are additional subscriber modes, the process selects the next subscriber mode, as depicted at block 110. For the newly selected subscriber mode, the process continues by selecting neighbor identifiers for another neighbor scan list, as illustrated at block 106.

If there are no additional subscriber modes, the process determines whether or not there are additional cells in the cellular communication system for which neighbor scan list should be selected, as depicted at block 112. If there are additional cells, the process selects the next cell in the cellular service area, as illustrated at block 114, and continues processing at block 104.

After neighbor scan lists have been generated for all subscriber modes in all cells, the process generates a candidate scan list for each cell, wherein the candidate scan list is the union of the neighbor identifiers in the scan lists for each subscriber mode, as depicted at block 116. Thus, the candidate scan list contains all neighbor identifiers that are in one or more neighbor scan lists associated with the subscriber modes in a particular cell.

Next, the process generates mode instructions, which enable the subscriber unit to select neighbor identifiers from the candidate scan list to derive a neighbor scan list for each subscriber mode, as illustrated at block 118. With reference to FIG. 5, there is depicted an example of a candidate scan list and the associated mode instructions, which may be determined according to blocks 116 and 118 of FIG. 2. The mode instructions give the subscriber unit enough information to derive neighbor scan lists for whatever mode the subscriber unit is currently operating in. Sample instructions include: an all mode instruction, an idle mode only instruction, and an active mode only instruction. Thus, some instructions cause selected neighbor identifiers to be used in both active and idle modes, while other instructions cause the subscriber unit to select neighbor identifiers in only the active mode or only the idle mode. FIGS. 6 and 7 represent lists derived from information in FIG. 5.

Other mode instructions may take the form of instructions that modify the current neighbor scan list to derive a scan list for a new mode of operation. Such modification instructions may include an instruction that temporarily adds, or temporarily deletes, a selected neighbor identifier when the subscriber unit enters, say, the active mode.

After neighbor scan lists are selected for each operating mode in each cell, and the lists are consolidated to form candidate scan lists for each cell, and after subscriber mode instructions are generated, the process terminates, as illustrated at block 120.

Figure 3:
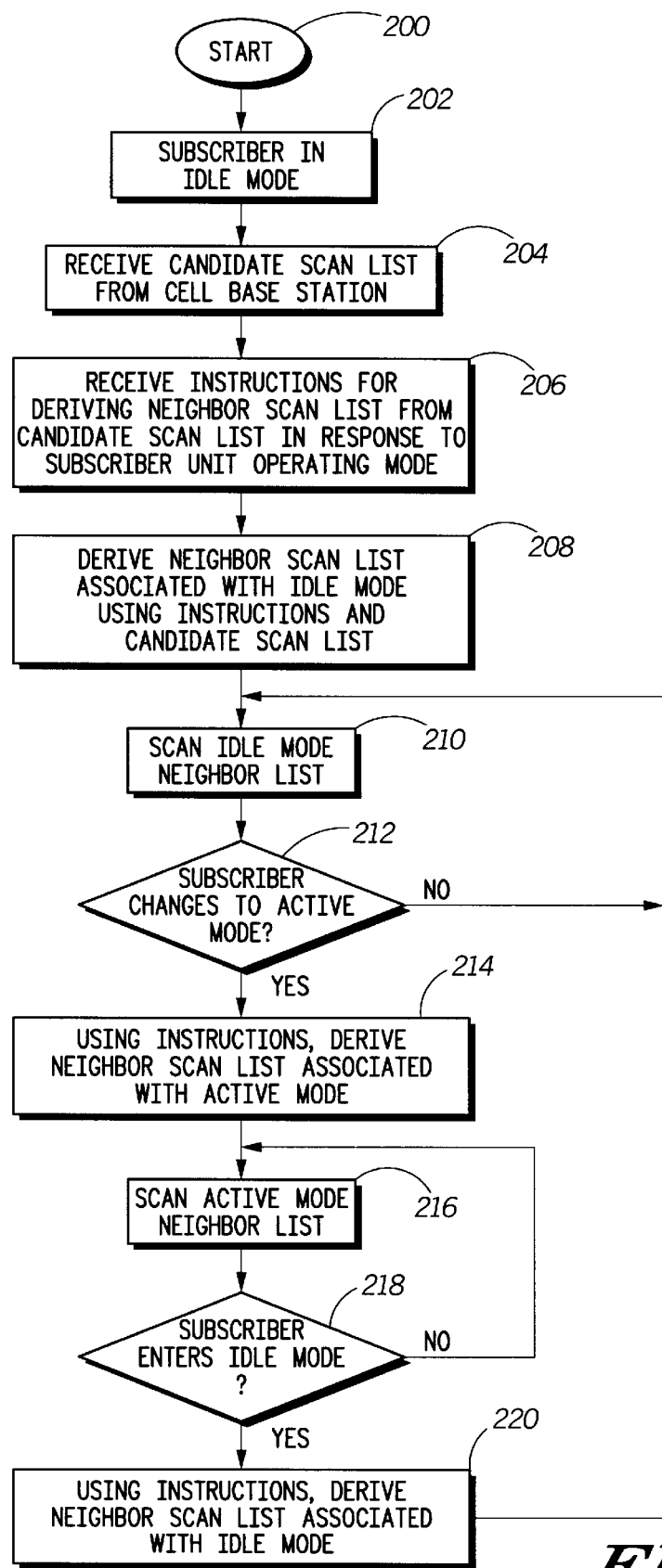
FIG. 3 is a high-level logical flow chart which illustrates deriving and scanning neighbor scan lists in response to a subscriber mode in accordance with the method and system of the present invention.

With reference now to FIG. 3, there is depicted a high-level flow chart depicting control of neighbor scanning in a subscriber unit in accordance with a preferred embodiment of the method and system of the present invention. As shown, the process begins at block 200, and thereafter passes to block 202 wherein the subscriber unit is in the idle mode. Thereafter, the subscriber unit receives a candidate scan list from a cell base station, as illustrated at block 204. The subscriber unit typically receives the candidate scan list via the paging channel, which is broadcast to all subscriber units in communication with the base station.

Next, the subscriber unit receives mode instructions for deriving neighbor scan lists from the candidate scan list in response to the subscriber unit operating mode, as depicted at block 206. Examples of these mode instructions are shown in the right hand column of FIG. 5. These mode instructions inform the subscriber unit how to select neighbor identifiers from the candidate scan list to derive a neighbor scan list according to the operating mode of the subscriber unit. Examples of these mode instructions include: an all mode instruction, an idle mode only instruction, and an active mode only instruction. Each instruction is associated with a neighbor identifier in the candidate scan list.

After receiving the candidate list, and the mode instructions, the subscriber unit derives a neighbor scan list associated with the idle mode by using the mode instructions and the candidate scan list, as illustrated at block 208. As depicted at block 210, the process then scans the idle mode neighbor scan list, and performs idle mode handoffs between base stations. As the subscriber hands off to a new base station, a new candidate scan list with new mode instructions may be received via a new paging channel.

Thereafter, the process determines whether or not the subscriber has changed to the active mode, as illustrated at block 212. If the subscriber has not changed to the active mode, the subscriber continues to scan the idle mode neighbor scan list as illustrated at block 210.

If the subscriber unit has changed to the active mode, the process derives a new neighbor scan list associated with the active mode by using the mode instructions, as depicted at block 214. Thereafter, the process scans the active mode neighbor scan list, as illustrated at block 216. As the subscriber unit is handed off to a new base station, a new candidate scan list with mode instructions may be transferred to the subscriber unit via the traffic channel.

As depicted at block 218, the process determines whether or not the subscriber unit has entered the idle mode, either by the user terminating the call with the end command, or by the call being dropped. If the subscriber has not entered the idle mode, the subscriber unit continues to scan the active mode neighbor scan list, as illustrated at block 216.

If the subscriber has entered the idle mode, the subscriber unit derives a neighbor scan list associated with the idle mode by using the mode instructions, as depicted at block 220. Thereafter, the process iteratively returns to block 210, wherein the subscriber unit scans the idle mode neighbor scan list.

According to the present invention, a subscriber unit may receive a separate neighbor scan list for each operating mode of the subscriber unit. However, in a preferred embodiment, which is illustrated in FIGS. 2 and 3, these scan list may be consolidated into a candidate scan list that has associated mode instructions for directing the subscriber unit to generate an appropriate scan list upon entering a new operating mode. It should also be emphasized that upon changing operating mode, no additional neighbor scan list instructions are needed from the cellular infrastructure system to derive a neighbor scan list for the new operating mode. All data necessary for deriving neighbor scan lists for all modes of operation may be transmitted to the subscriber unit over the paging channel while the subscriber unit is in the idle mode. This means that the subscriber unit has the active mode neighbor scan list before entering the active mode, and upon entering the active mode, the subscriber unit can immediately switch to a new scan list. Therefore, if a subscriber unit has initiated a call just before leaving a particular cell, it may immediately and automatically be reconfigured to scan pilot beacons, so that it can make measurements and report to the mobility manager to quickly facilitate a hard handoff from one carrier to another, or a hard handoff from one multiple access system to another.

With reference now to FIG. 4, there is depicted a high-level block diagram of a portion of a subscriber unit which may be used to implement the method and system of the present invention. As illustrated, subscriber unit 50 includes receiver 52 coupled to antenna 54. Receiver 52 receives, demodulates, and decodes signals from antenna 54. In a preferred embodiment, receiver 52 receives, demodulates, and decodes CDMA signals from a base station in a CDMA cellular communication system.

Controller 56 is coupled to receiver 52 for receiving a plurality of neighbor scan lists, which are then stored in memory 58. In one embodiment of the present invention, subscriber unit 50 may receive a neighbor scan list for each subscriber mode in the current cell. Examples of these scan list for various operating modes are illustrated in FIGS. 6 and 7. However, in a preferred embodiment of the present invention, a candidate scan list and an associated list of mode instructions are received in subscriber unit 50, wherein the lists shown in FIGS. 6 and 7 may be derived from the candidate list using the mode instructions. This reduces the number of neighbor identifiers transmitted to subscriber unit 50, and reduces the size of memory 58 required to store the plurality of neighbor scan list. Thus, in a preferred embodiment, memory 58 may be divided into candidate scan list memory 60 and mode instruction memory 62, for storing neighbor identifiers and mode instructions, as depicted in FIG. 5.

Controller 56 is also coupled to mode detector 64 for detecting an operating mode of subscriber unit 50. Such operating modes may include an idle operating mode and an active operating mode.

Controller 56 is further coupled to scanner 66, which measures signal characteristics of signals from other cells as such signals are received by antenna 54. Neighbor scan list 68 is depicted within scanner 66 to illustrate the fact that a neighbor scan list comprising neighbor identifiers is derived or recalled from data stored in memory 58. Thus, those persons skilled in the art will understand that neighbor scan list 68 may be stored in memory in scanner 66 or may be stored in memory 58. According to an important aspect of the present invention, the neighbor identifiers in neighbor scan list 68 are selected by controller 56 in response to input from mode detector 64 and mode instructions. Therefore, neighbor scan list 68 may change according to the operating mode of subscriber unit 50.

While scanner 66 is shown separately from receiver 52, scanner 66 may share significant portions of the hardware used in receiver 52.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a cellular communication system for controlling neighbor scanning in a subscriber unit, the method comprising the steps of:

generating a plurality of neighbor scan lists associated with a selected cell in the cellular communication system, including a neighbor scan list associated with an idle mode and a neighbor scan list associated with an active mode, wherein each neighbor scan list includes selected neighbor identifiers;

determining a present operating mode of a plurality of operating modes of a subscriber unit communicating with the selected cell;

in response to the present operating mode of the subscriber unit, configuring the subscriber unit to scan a neighbor scan list selected from the plurality of neighbor scan lists for the selected cell; and prior to detecting an operating mode change in the subscriber unit from the idle mode to the active mode, communicating to the subscriber unit the scan list associated with the idle mode and the scan list associated with the active mode.

2. The method for controlling neighbor scanning according to claim 1 wherein each of the plurality of neighbor scan lists is associated with one of the plurality of operating modes of the subscriber unit.

3. The method for controlling neighbor scanning according to claim 1 further includes the steps of:

detecting a change in operating modes in the subscriber unit; and in response to the change, automatically reconfiguring the subscriber unit to scan an alternate neighbor scan list selected from the plurality of neighbor scan lists for the selected cell.

4. The method for controlling neighbor scanning according to claim 3 further including the step of in response to detecting an operating mode change from the idle mode to the active mode, automatically reconfiguring the subscriber unit to scan the neighbor scan list associated with the active mode.

5. The method for controlling neighbor scanning according to claim 1 wherein the step of communicating to the subscriber unit a plurality of neighbor scan lists further includes the steps of:
communicating to the subscriber unit a candidate scan list that is the union of at least the present operating mode scan list and a second operating mode scan list; and
communicating mode instructions to the subscriber unit for deriving, from the candidate scan list, a plurality of neighbor scan lists including at least the present operating mode scan list and the second operating mode scan list.

6. The method for controlling neighbor scanning according to claim 5 wherein the step of communicating mode instructions to the subscriber unit for deriving a plurality of neighbor scan lists from the candidate scan list further includes the step of communicating mode instructions to the subscriber unit for deleting neighbor identifiers from the present operating mode scan list to derive the second operating mode neighbor scan list.

7. The method for controlling neighbor scanning according to claim 5 wherein the step of communicating mode instructions to the subscriber unit for deriving a plurality of neighbor scan lists from the candidate scan list further includes the step of communicating mode instructions to the subscriber unit for adding neighbor identifiers from the candidate scan list to derive the second operating mode neighbor scan list.

8. The method for controlling neighbor scanning according to claim 5 wherein the step of communicating mode instructions to the subscriber unit for deriving a plurality of neighbor scan lists from the candidate scan list further includes the step of communicating a mode instruction associated with each neighbor identifier in the candidate scan list to the subscriber unit, wherein the mode instruction is one of a group comprising: scan an associated neighbor identifier in all operating modes, scan an associated neighbor identifier only in an active mode, and scan an associated neighbor identifier only in an idle mode.

9. A system in a cellular communication system for controlling neighbor scanning in a subscriber unit comprising:
means for generating a plurality of neighbor scan lists associated with a selected cell in the cellular communication system, including a neighbor scan list associated with an idle mode and a neighbor scan list associated with an active mode, wherein each neighbor scan list includes selected neighbor identifiers;
means for determining a present operating mode of a plurality of operating modes of a subscriber unit communicating with the selected cell;
means for configuring the subscriber unit to scan a neighbor scan list selected from the plurality of neighbor scan lists for the selected cell, in response to the present operating mode of the subscriber unit; and
means for communicating to the subscriber unit, prior to detecting an operating mode change in the subscriber unit from the idle mode to the active mode, the scan list associated with the idle mode and the scan list associated with the active mode.

10. The system for controlling neighbor scanning according to claim 9 wherein each of the plurality of neighbor scan lists is associated with one of the plurality of operating modes of the subscriber unit.

11. The system for controlling neighbor scanning according to claim 9 further comprising:
means for detecting a change in operating modes in the subscriber unit; and
means for automatically reconfiguring the subscriber unit to scan an alternate neighbor scan list selected from the plurality of neighbor scan lists for the selected cell in response to the change.

12. The system for controlling neighbor scanning according to claim 11 further comprising means for automatically reconfiguring the subscriber unit to scan the neighbor scan list associated with the active mode in response to detecting an operating mode change from the idle mode to the active mode.

13. The system for controlling neighbor scanning according to claim 12 wherein the means for communicating to the subscriber unit a plurality of neighbor scan lists further includes:
means for communicating to the subscriber unit a candidate scan list that is the union of at least the present operating mode scan list and a second operating mode scan list; and
means for communicating mode instructions to the subscriber unit for deriving, from the candidate scan list, a plurality of neighbor scan lists including at least the present operating mode scan list and the second operating mode scan list.

14. The system for controlling neighbor scanning according to claim 13 wherein the means for communicating mode instructions to the subscriber unit for deriving a plurality of neighbor scan lists from the candidate scan list further includes means for communicating mode instructions to the subscriber unit for deleting neighbor identifiers from the present operating mode scan list to derive the second operating mode neighbor scan list.

15. The system for controlling neighbor scanning according to claim 13 wherein the means for communicating mode instructions to the subscriber unit for deriving a plurality of neighbor scan lists from the candidate scan list further includes means for communicating mode instructions to the subscriber unit for adding neighbor identifiers from the candidate scan list to derive the second operating mode neighbor scan list.

16. The system for controlling neighbor scanning according to claim 13 wherein the means for communicating mode instructions to the subscriber unit for deriving a plurality of neighbor scan lists from the candidate scan list further includes means for communicating a mode instruction associated with each neighbor identifier in the candidate scan list to the subscriber unit, wherein the mode instruction is one of a group comprising: scan an associated neighbor identifier in all operating modes, scan an associated neighbor identifier only in an active mode, and scan an associated neighbor identifier only in an idle mode.

17. The method for controlling neighbor scanning according to claim 1 wherein a neighbor scan list associated with an active mode further includes a neighbor scan list associated with a mode having a channel assigned for transferring user data.

18. The system for controlling neighbor scanning according to claim 9 wherein a neighbor scan list associated with an active mode further includes a neighbor scan list associated with a mode having a channel assigned for transferring user data.

* * * * *